L. D. MAUPIN.
Nut-Lock.

No. 203,633. Patented May 14, 1878.

WITNESSES
Sam'l R Turner
R. H. Lacey

INVENTORS
Lilbourn D. Maupin
By R.S. & A.T. Lacey Attorneys

N. PETERS, PHOTO-LITHOGRAPHER, WASHINGTON, D. C.

UNITED STATES PATENT OFFICE.

LILBOURN D. MAUPIN, OF RENICK, MISSOURI, ASSIGNOR OF ONE-HALF HIS RIGHT TO JAMES R. MILES, OF SAME PLACE.

IMPROVEMENT IN NUT-LOCKS.

Specification forming part of Letters Patent No. 203,633, dated May 14, 1878; application filed April 9, 1878.

*To all whom it may concern:*

Be it known that I, LILBOURN D. MAUPIN, of Renick, in the county of Randolph and State of Missouri, have invented certain new and useful Improvements in Nut-Locks; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of this invention is to furnish an improved nut-lock, the details of which will be hereinafter fully described.

It consists of a washer or fish-bar on railroad-rails, and to which is pivoted a revolving keeper, which turns down over the nut-holder and secures it in position against the nuts.

Figure 1:
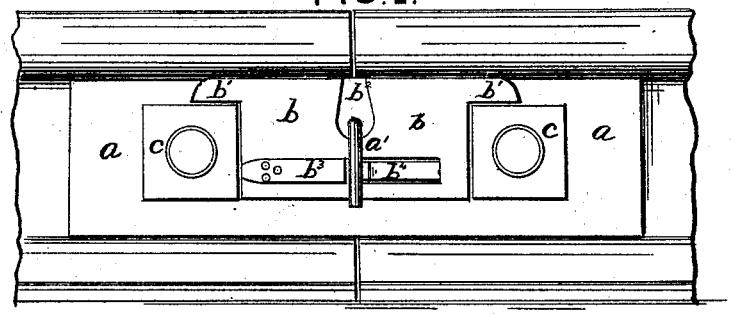
Figure 2:
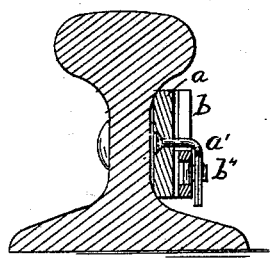
Figure 3:
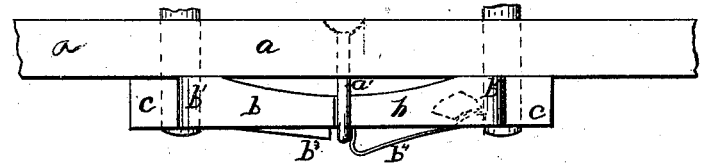
Figure 4:
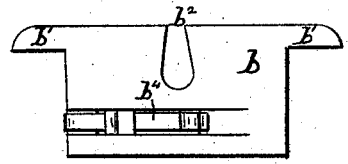

In the drawings, Figure 1 is a side elevation of my device attached to railroad-rails; Fig. 2, a vertical cross-section of Fig. 1; Fig. 3, an edge view of a washer and lock, and Fig. 4 a view of the holder.

$a$ is the washer or fish-bar, in which the keeper $a'$ is secured, with capability of being turned up or down, as desired, as hereinafter explained, and is so arranged on the said washer as to be intermediately between the nuts to be locked. $b$ is the holder. It has two projections, $b^1 b^1$, which rest on the nuts $c c$, and prevent the latter from turning. It is cut away so as to provide an opening, $b^2$, through which the shank of the keeper projects. The central part of the holder extends downward between the nuts, and has provided on its face a shoulder, $b^3$, and spring-latch $b^4$. The keeper is held between the latch-spring and the shoulder when the holder is applied, for the purpose of locking the nuts.

To unlock the device, the spring $b^4$ is pressed down and the keeper $a'$ is turned up to a vertical position, after which the holder may be removed and the nuts released.

When this nut-lock is designed to be applied to nuts on devices wherein there are no jolting movements, it can be constructed without the shoulder $b^3$ and the spring-latch.

The weight of the keeper in this case will be sufficient in itself to retain the holder in position without liability of accidental displacement.

Having described my invention, what I claim, and desire to secure by Letters Patent, is—

In a nut-lock, the holder $b$, constructed with the shoulders $b^1 b^1$, and provided with the spring-latch $b^4$, in combination with the keeper $a'$, journaled in the washer $a$, substantially as set forth.

In testimony that I claim the foregoing as my own I affix my signature in presence of two witnesses.

LILBOURN D. MAUPIN.

Witnesses:
 J. A. MITCHELL,
 G. A. JONES.